United States Patent
Holmes

[11] 3,996,733
[45] Dec. 14, 1976

[54] REINFORCING CORD CONSTRUCTION
[75] Inventor: Barry B. Holmes, Miami Shores, Fla.
[73] Assignee: Uniroyal Inc., New York, N.Y.
[22] Filed: Jan. 27, 1976
[21] Appl. No.: 652,673
[52] U.S. Cl. ............................................. 57/145
[51] Int. Cl.$^2$ ........................................ D07B 1/06
[58] Field of Search ............. 57/139, 140 R, 140 J, 57/144, 145, 147, 149, 148

[56] References Cited
UNITED STATES PATENTS

| | | | |
|---|---|---|---|
| 2,605,201 | 7/1952 | Howe | 57/145 |
| 3,336,744 | 8/1967 | Peene | 57/145 |
| 3,358,435 | 12/1967 | Peene | 57/145 |
| 3,555,789 | 1/1971 | Terragna | 57/145 |
| 3,600,884 | 8/1971 | Yazawa | 57/145 X |
| 3,659,038 | 4/1972 | Shealy | 57/145 X |
| 3,762,145 | 10/1973 | Kikuchi et al. | 57/145 |
| 3,834,149 | 9/1974 | Nisbet | 57/145 |

FOREIGN PATENTS OR APPLICATIONS

| | | | |
|---|---|---|---|
| 1,034,328 | 6/1966 | United Kingdom | 57/145 |
| 1,034,327 | 6/1966 | United Kingdom | 57/145 |

Primary Examiner—Donald E. Watkins
Attorney, Agent, or Firm—Philip Sands

[57] ABSTRACT

A metallic reinforcing cord structure suitable for reinforcing elastomeric articles characterized by a high compression modulus which increases resistence to buckling and fatigue failure and by improved adherence between the core and the elastomeric article in which it is embedded is disclosed. The cord comprises a core consisting of two equal diameter brass plated steel wires and an outer layer of six equal diameter brass plated steel wires disposed about the core wires, the diameter of the outer layer wires being between about 1.23 and about 1.43 times the diameter of the core wires. The two core wires are twisted about one another and the outer wires are twisted about the core. Both the core and the outer wires are laid in the same direction.

This abstract is not to be taken either as a complete exposition or as a limitation of the present invention, however, the full nature and the extent of the invention being discernible only by reference to and from the entire disclosure.

10 Claims, 2 Drawing Figures

≤ 1 …

REINFORCING CORD CONSTRUCTION

BACKGROUND OF THE INVENTION

This invention relates to a metallic reinforcing cord structure and more particularly to such structure suitable for reinforcing elastomeric articles such as pneumatic tires, reinforced hoses and the like.

Metallic reinforcing cord structures of the type herein disclosed have long been known in the art. They are conventionally utilized in pneumatic vehicle tires, and more particularly in the breaker structures of such tires, in conveyor and drive belts and in high pressure hoses. Clearly therefore, it is advantageous for such reinforcing cord structures to have certain properties, such as a high compression modulus which increases resistance to buckling and fatigue failure, and to be highly adherent to the elastomeric material in which the reinforcing cord structure is embedded.

Representative examples of reinforcing cord structures known in the prior art are exemplified by U.S. Pat. No. 3,336,744 and U.S. Pat. No. 3,032,963. U.S. Pat. No. 3,336,744 to Peene illustrates a metallic reinforcing cord structure including two interior core wires, six exterior wires symmetrically disposed about the two core wires, the diameter of the outer wires being between about 1.7 and about 2 times the diameter of the cores wires and a single wire helically wrapped about the six outer wires for the purpose of improving the adherence of the cord structure to the material in which it is embedded. This structure has been found to be not completely satisfactory without the inclusion of a helically wrapped filament about the outer wires, the wrapping of which filament requires an expensive and complex process, both because its compression would not be sufficiently high for use in high stress environments such as, for example, in pneumatic vehicle tires which must be able to withstand repeated tension, compression and bending stresses and further because the adhesion between the reinforcing cord structure and the elastomeric material in which it is embedded would be insufficient if the cord structure were wrapped closely enough to render it stable without utilizing the expedient of the helical wrap. U.S. Pat. No. 3,032,963 to Fenner discloses a cord structure in which three equal diameter wires in a triangular configuration are used to form the core of the cord and six equal diameter wires are symmetrically disposed about the core, the diameter of each of the outer wires being approximately twice that of each of the core wires. This structure has also been found to be not completely satisfactory because the compression modulus of the structure is lower than that required by high compression stress uses.

SUMMARY OF THE INVENTION

It is, therefore, an important object of the present invention to provide an improved metallic reinforcing cord structure suitable for reinforcing elastomeric articles by means of which the aforesaid drawbacks and disadvantages may be most efficaciously avoided.

It is a further object of this invention to provide a metallic reinforcing cord structure having a high compression modulus.

It is yet another object of this invention to provide a metallic reinforcing cord structure suitable for reinforcing elastomeric articles which exhibits a high degree of adherence to the elastomeric article in which it is embedded.

It is still a further object of this invention to provide a stable metallic reinforcing cord structure for reinforcing elastomeric articles which is sufficiently open to exhibit a high degree of adherence to such articles without requiring the expedient of a helically wound overwrapping wire to obtain stability.

Generally speaking, the objectives of the present invention are obtained by the provision of a metallic reinforcing cord structure suitable for reinforcing elastomeric articles comprising a core consisting of two equal diameter metallic wires and an outer layer consisting of six equal diameter metallic wires disposed about said core wires, the diameter of said outer layer wires being generally between about 1.23 and about 1.43 times the diameter of the core wires.

BRIEF DESCRIPTION OF THE DRAWINGS

The foregoing and other objects and features of the present invention will be more clearly understood from the following detailed description thereof when read in conjunction with the accompanying drawings, in which.

DESCRIPTION OF THE PREFERRED EMBODIMENT

Figures 1, 2:
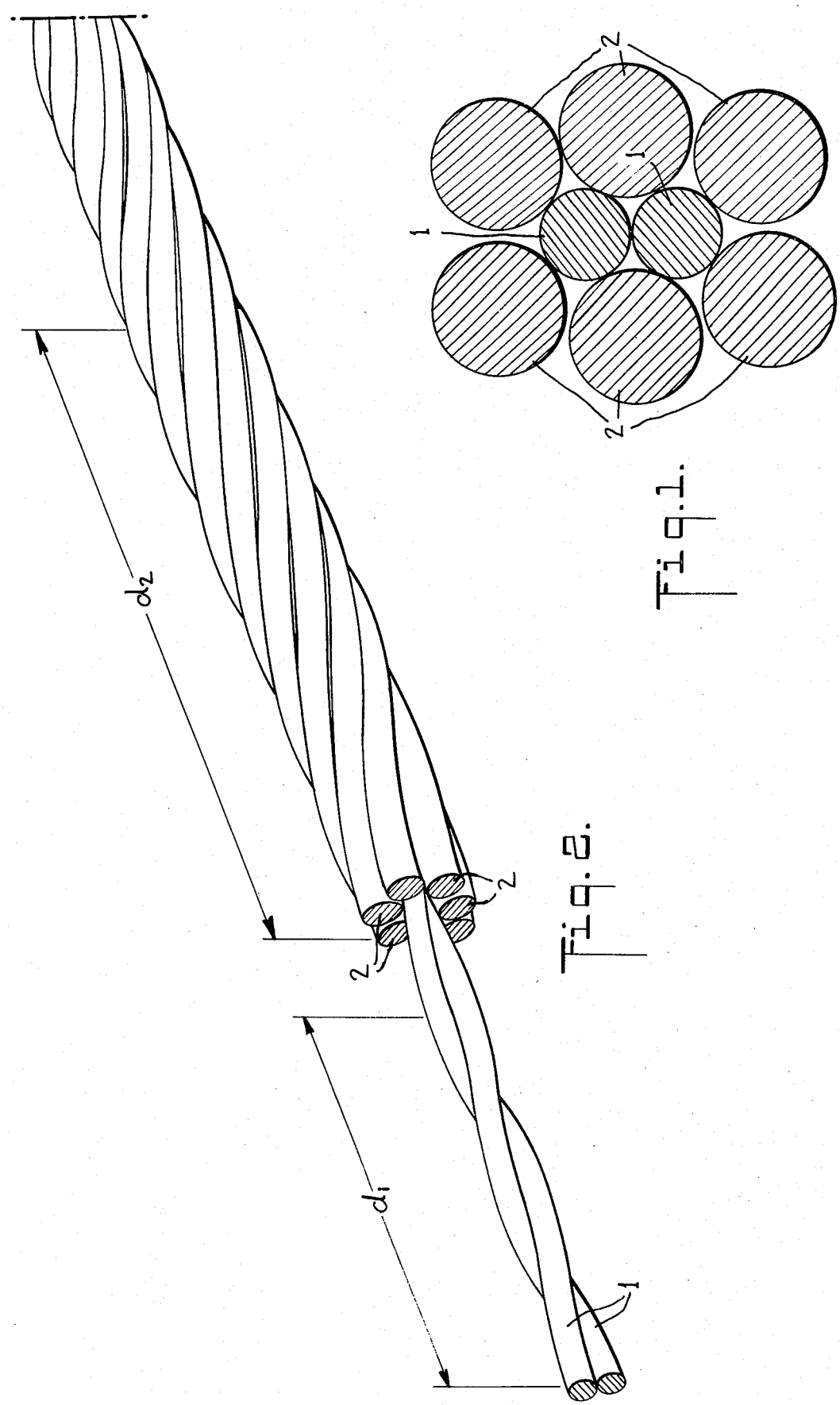
FIG. 1 is a cross-sectional view of the reinforcing cord structure of the instant invention.
FIG. 2 is a perspective view of the reinforcing cord structure illustrated in FIG. 1.

Referring now to FIG. 1 there is shown a cross-sectional view of the metallic reinforcing cord structure according to the invention. The two circular cross-section wires 1, which may be, for example, of brass plated steel, are in contact with one another and form the core of the cord structure. The six circular cross-section wires 2, which may also, for example, be of brass plated steel are disposed about the core and form the outer layer of the cord structure. The two wires 1 which comprise the core are twisted about one another and the six outer layer wires are helically twisted about the core, the core wires 1 and the outer layer wires 2 being laid in the same direction, so as to reduce the abrasion between the wires. In cross-section, as shown in FIG. 1, the core consisting of the two wires 1 is generally elliptical. It will be understood, of course, that, inasmuch as the two wires 1 are twisted about one another, various cross-sections taken along the length of the core, will, although generally elliptical, be pitched relative to one another. In the same manner, the outer layer wires 2, will be, although not necessarily symmetrically disposed about the core at any particular point, generally uniformly disposed about the core along the length of the cord.

The diameters of the two wires 1 forming the core are of the same diameter and in a preferred embodiment have a diameter of 0.175 millimeters and the diameters of each of the outer layer wires 2 are equal, the diameter in this embodiment being approximately 0.25 millimeters, the ratio of the diameters of the outer wires 2 to the diameter of the inner wires 1 thus being approximately 1.43.

Other embodiments which have been found to be advantageous, especially for use in the breakers of pneumatic vehicle tires, all of which embodiments have the same configuration as that illustrated in FIG. 1, have included those in which the diameter of the core wires is 0.2 millimeters and the corresponding outer wire diameter is 0.27 millimeters, resulting in an outer wire diameter to core diameter ratio of 1.35; a core wire diameter of 0.22 millimeters and an outer wire diameter of 0.27 millimeters, resulting in an outer wire diameter to core wire diameter ratio of 1.23; a core wire diameter of 0.2 millimeters and an outer wire diameter of 0.28 millimeters, resulting in an outer wire diameter to core wire diameter ratio of 1.4; and a core wire diameter of 0.28 millimeters and an outer wire diameter of 0.38 millimeters, resulting in an outer wire diameter to core wire diameter ratio of 1.36. The last mentioned embodiment, which included core wires having a diameter of 0.28 millimeters and outer wires having a diameter of 0.38 millimeters has proved particularly advantageous for use in the breakers of large heavy service vehicle tires. The first mentioned preferred embodiment, that is, the embodiment in which the diameter of the core wires is 0.175 millimeters and the diameter of the outer wires is 0.25 millimeters has been found particularly suitable for use in the breakers of passenger and small heavy service vehicle tires.

Turning now to FIG. 2 there is illustrated a perspective view of the instant reinforcing cord structure which more clearly illustrates the twist or pitch of the core wires 1 and the other layer wires 2 as well as the spacing between the outer layer wires 2, which spacing permits the penetration of the elastomeric material into the cord structure thereby improving the adhesion of the cord structure to the elastomeric material in which it is embedded. It is noted that, notwithstanding the openness of the instant cord structure, it is nevertheless stable, and that this stability is achieved without the use of the previously required helically wound over wrapping wire, the incorporation of which, as above noted, involves an additional and costly production process. The twist of both the core wires 1 and the outer layer wires 2 may clearly be seen in FIG. 2. As illustrated, the distance *l*1 indicates a complete cycle of the wires 1 which may be, by way of example only, on the order of six millimeters. A complete cycle of each of the six wires 2 is indicated at *l*2 and this distance may be, by way of example only, on the order of 12 millimeters.

It has been found that the instant structure permits the straightforward manufacture of a highly stable reinforcing cord, that is, one which has only a minimal tendency to unwind, which cord has a satisfactorily high compression modulus and which adheres satisfactorily to the elastomeric material in which it is embedded.

It will be understood that the foregoing description of the preferred embodiments of the present invention is for purposes of illustration only and that the various structural and operational features as herein disclosed are susceptible to a number of modifications and changes none of which entail any departure from the spirit and scope of the present invention as defined in the hereto appended claims.

What is claimed is:

1. A metallic reinforcing cord structure suitable for reinforcing elastomeric articles comprising:
 a core consisting of two equal diameter metallic wires; and
 an outer layer consisting of six equal diameter metallic wires disposed about said core wires,
 the diameter of said outer layer wires being generally between about 1.23 and about 1.43 times the diameter of the core wires.

2. A metallic reinforcing cord structure according to claim 1 wherein said two core wires are twisted about one another and said six outer wires are each twisted about said core wires, said core wires and said outer wires being laid in the same direction.

3. A metallic reinforcing cord structure according to claim 1 wherein both said core wires and said outer layer wires are of brass plated steel.

4. A metallic reinforcing cord structure according to claim 1 wherein the cross section of said core is generally elliptical.

5. A metallic reinforcing cord structure according to claim 1 wherein each of said core wires and each of said outer layer wires have generally circular cross sections.

6. A metallic reinforcing cord structure according to claim 1 wherein the diameter of each of said core wires is approximately 0.175 millimeters and the diameter of each of said outer layer wires is approximately 0.25 millimeters.

7. A metallic reinforcing cord structure according to claim 1 wherein the diameter of each of said core wires is approximately 0.2 millimeters and the diameter of each of the outer layer wires is approximately 0.27 millimeters.

8. A metallic reinforcing cord structure according to claim 1 wherein the diameter of each of the core wires is approximately 0.22 millimeters and the diameter of each of the outer layer wires is approximately 0.27 millimeters.

9. A metallic reinforcing cord structure according to claim 1 wherein the diameter of each of the core wires is approximately 0.2 millimeters and the diameter of each of the outer layer is approximately 0.28 millimeters.

10. A metallic reinforcing cord structure according to claim 1 wherein the diameter of each of the core wires is approximately 0.28 millimeters and the diameter of each of the outer layer wires is approximately 0.38 millimeters.

* * * * *

UNITED STATES PATENT AND TRADEMARK OFFICE
CERTIFICATE OF CORRECTION

PATENT NO. : 3996733
DATED : December 14, 1976
INVENTOR(S) : Barry B. Holmes

It is certified that error appears in the above-identified patent and that said Letters Patent are hereby corrected as shown below:

At column 4, line 47 in claim 9 after "outer layer" insert -- wires --.

Signed and Sealed this

Twenty-seventh Day of June 1978

[SEAL]

Attest:

RUTH C. MASON
Attesting Officer

DONALD W. BANNER
Commissioner of Patents and Trademarks